UNITED STATES PATENT OFFICE.

JEAN JOSEPH GATHY, OF MONS, BELGIUM.

PROCESS OF TREATING DOLOMITE.

971,368.  Specification of Letters Patent.  Patented Sept. 27, 1910.

No Drawing.  Application filed January 11, 1910. Serial No. 537,490.

*To all whom it may concern:*

Be it known that I, JEAN JOSEPH GATHY, a subject of the King of Belgium, and resident of Mons, Belgium, have invented a certain new and useful Process of Treating Dolomite, of which the following is a specification.

This invention relates to a process for treating dolomite.

According to this process the dolomite is first calcined whereby lime and oxid of magnesium are obtained. This product is hydrated or not, according to the quality of the dolomite treated but in any case this product of the calcination must be converted into the shape of a fine powder previously to the chemical action. The calcined dolomite is submitted to a levigation by means of a concentrated solution of chlorid of calcium, which dissolves the lime without acting upon the magnesia. When this operation is carried out with the aid of the heat, the output is much higher. Oxychlorid of calcium is formed which is much more soluble when heated than when cold so that it will be sufficient to cool the solution for causing the oxychlorid to be crystallized. It is thus obtained in a very pure state and is easy to be separated by filtration or decantation. If one has the opportunity of employing this oxychlorid, the operation simply consists in utilizing a hot solution of chlorid of calcium which leaves on the filter the hydrated magnesia, and in causing the oxychlorid to crystallize by cooling. The magnesia thus obtained is washed and dried. It is suitable for industrial uses. However, as the applications of the oxychlorid are limited ones it is generally preferable to regenerate the chlorid of calcium by carbonating the lime of the oxychlorid by means of the gases which escape from the calcining ovens. This carbonation may be carried out by treating directly the crystallized oxychlorid or by acting upon the hot solution or on the partially cooled solution. The carbonate of lime obtained in this manner has properties which are utilized practically.

I claim—

1. A process for treating dolomite consisting in calcining the dolomite, dissolving the lime of the finely powdered calcined product by means of a solution of chlorid of calcium, filtering the solution, causing the oxychlorid of calcium to crystallize and regenerating the chlorid of calcium by carbonating the oxychlorid of calcium by means of the gases escaping from the calcining kilns, substantially as and for the purpose set forth.

2. A process for treating dolomite consisting in calcining the dolomite, dissolving the lime of the finely powdered calcined product by means of a hot solution of chlorid of calcium, filtering the solution, and regenerating the chlorid of calcium by carbonating the hot solution escaping from the filter by means of the gases escaping from the calcining kilns, substantially as and for the purpose set forth.

3. A process for treating dolomite consisting in calcining the dolomite, dissolving the lime of the finely powdered calcined product by means of a hot solution of chlorid of calcium, filtering the solution, partially cooling the solution escaping from the filter and regenerating the chlorid of calcium by carbonating the said partially cooled solution, by means of the gases escaping from the calcining kilns, substantially as and for the purpose set forth.

In testimony whereof I have hereunto set my hand in presence of two witnesses.

JEAN JOSEPH GATHY.

Witnesses:
C. VANBELSEN,
GREGORY PHELAN.